United States Patent
Fearnley et al.

(10) Patent No.: US 7,469,417 B2
(45) Date of Patent: Dec. 23, 2008

(54) INFRASTRUCTURE METHOD AND SYSTEM FOR AUTHENTICATED DYNAMIC SECURITY DOMAIN BOUNDARY EXTENSION

(75) Inventors: Jolyon A. Fearnley, Cheltenham (GB); Beresford Shute, Whitley Bay (GB); Brian Johnson, Surrey (GB); Diane Furniss, Duffield (GB); David A. Waters, Dublin (IE)

(73) Assignee: Electronic Data Systems Corporation, Plano, TX (US)

( * ) Notice: Subject to any disclaimer, the term of this patent is extended or adjusted under 35 U.S.C. 154(b) by 912 days.

(21) Appl. No.: 10/462,994

(22) Filed: Jun. 17, 2003

(65) Prior Publication Data

US 2004/0260941 A1    Dec. 23, 2004

(51) Int. Cl.
*G06F 7/04*     (2006.01)
*H04L 9/00*     (2006.01)

(52) U.S. Cl. .................... 726/4; 726/2; 726/5; 713/164
(58) Field of Classification Search ................ 726/2, 726/7, 4, 5; 713/164
See application file for complete search history.

(56) References Cited

U.S. PATENT DOCUMENTS

| | | | |
|---|---|---|---|
| 5,692,124 A * | 11/1997 | Holden et al. | 726/2 |
| 6,044,378 A * | 3/2000 | Gladney | 707/103 R |
| 6,108,787 A * | 8/2000 | Anderson et al. | 726/5 |
| 6,317,868 B1 * | 11/2001 | Grimm et al. | 717/127 |
| 6,332,130 B1 * | 12/2001 | Notani et al. | 705/28 |
| 6,526,513 B1 * | 2/2003 | Shrader et al. | 726/4 |
| 6,604,123 B1 * | 8/2003 | Bruno et al. | 718/100 |
| 6,606,706 B1 * | 8/2003 | Li | 713/162 |
| 6,609,153 B1 * | 8/2003 | Salkewicz | 709/223 |
| 6,708,187 B1 * | 3/2004 | Shanumgam et al. | 707/201 |
| 6,718,385 B1 * | 4/2004 | Baker et al. | 709/225 |
| 6,886,038 B1 * | 4/2005 | Tabbara et al. | 709/223 |
| 6,990,591 B1 * | 1/2006 | Pearson | 726/22 |
| 7,017,188 B1 * | 3/2006 | Schmeidler et al. | 726/26 |
| 7,062,654 B2 * | 6/2006 | Millen et al. | 713/182 |
| 7,073,059 B2 * | 7/2006 | Worely et al. | 713/168 |
| 7,140,044 B2 * | 11/2006 | Redlich et al. | 726/27 |
| 7,159,240 B2 * | 1/2007 | England et al. | 726/6 |
| 7,213,247 B1 * | 5/2007 | Wilner et al. | 718/100 |
| 2001/0027484 A1 * | 10/2001 | Nishi | 709/223 |

(Continued)

FOREIGN PATENT DOCUMENTS

WO    WO 0126322 A2 *    4/2001

*Primary Examiner*—Emmanuel L Moise
*Assistant Examiner*—Techane J Gergiso
(74) *Attorney, Agent, or Firm*—Munck Carter, P.C.

(57) ABSTRACT

A method and system for authenticated dynamic extension of security domain boundaries includes high security domain extension instructions for sequentially and dynamically forming an extended high security domain (133) through a protected communication path (128). The protected communication path (128) extends from a first computer (10) associated with a high security domain (80) into a second computer (10) associated with low security domain (120). The method and system establish the extended high security domain (133) within the second computer (10). A protected communication path (128) forms an isolation barrier (131) separating the extended high security domain (133) from other objects (126) within the low security domain (120). Authentication instructions (146) temporarily 20 authenticate at least one object (132) associated with the low security domain (120). Returning instructions (156) return the at least one object (132) processed within the extended high security domain (133) to said low security domain (120).

15 Claims, 4 Drawing Sheets

U.S. PATENT DOCUMENTS

| | | | |
|---|---|---|---|
| 2002/0114469 A1* | 8/2002 | Faccin et al. | 380/270 |
| 2002/0129239 A1* | 9/2002 | Clark | 713/153 |
| 2002/0188869 A1* | 12/2002 | Patrick | 713/201 |
| 2003/0033521 A1* | 2/2003 | Sahlbach | 713/156 |
| 2003/0056096 A1* | 3/2003 | Albert et al. | 713/168 |
| 2003/0110372 A1* | 6/2003 | Proudler | 713/150 |
| 2003/0120610 A1* | 6/2003 | Hamber | 705/67 |
| 2003/0140243 A1* | 7/2003 | Nusser et al. | 713/200 |
| 2003/0154391 A1* | 8/2003 | Ayars et al. | 713/194 |
| 2003/0167401 A1* | 9/2003 | Murren et al. | 713/200 |
| 2004/0003251 A1* | 1/2004 | Narin et al. | 713/172 |
| 2004/0059946 A1* | 3/2004 | Price | 713/201 |
| 2004/0123152 A1* | 6/2004 | Le Saint | 713/201 |
| 2004/0235452 A1* | 11/2004 | Fischer et al. | 455/410 |
| 2005/0066160 A1* | 3/2005 | Parham et al. | 713/155 |

\* cited by examiner

INFRASTRUCTURE METHOD AND SYSTEM FOR AUTHENTICATED DYNAMIC SECURITY DOMAIN BOUNDARY EXTENSION

TECHNICAL FIELD OF INVENTION

The invention, in general, relates to a method and system for dynamically extending the authenticated security domain boundary of a network of computing devices.

BACKGROUND OF THE INVENTION

Organizations providing information technology services to customers face a problem of separating their own data from their customer's data. This problem is exacerbated when the customer is a national government and the information technology service provider is a multi-national company. In such a situation, the customer must provide a system of protective markings for its data which the information technology service provider's global infrastructure may not support. Oftentimes, only a portion of an information technology service provider's staff possesses the needed security clearances to process the data a customer requires. As a result, there is a need for the information technology service providers to have some of its employees access the data, while preventing other employees from doing so.

Traditionally, the service provider's environment and the customer's data environment have been completely separated where security concerns exist. In these, so-called "air-gapped" situations, the service provider's staff work in an environment provided by the customer, which environment has been appropriately cleared for the appropriate level of information security. Most of the time, these environments are located on the customer's premises.

While it is abundantly certain that the information technology service provider's staff members must hold the appropriate security clearances to access the information in question, what is not certain or unavoidable is the need for the respective staff members to work at the customer's premises nor is it clear that there must be multiple separated systems for the service provider. In fact, many situations make providing information technology services in such restricted situations both economically and managerially untenable.

One approach to addressing these problems employs a concept called a security domain. Briefly, a security domain provides an aggregation of users, network connections and information technology equipment within which data may be processed subject to discretionary access control. For a security domain, a boundary is defined across which strict control of all data transfer occurs. From a customer's viewpoint, the security domain where the customer both physically and electronically controls the users and the data is generally considered as different from the security domain relating to the information technology service provider. While appropriate handling of data according to marking may be achieved by both electronic and procedural means, handling procedures determine whether a security domain is a "high security domain" or a "low security domain."

Within a security domain the relative sensitivity of data elements is indicated by a system of markings, which may be explicit or implicit. For example some data may be "not protectively marked", some may be "restricted", some may be "confidential". Appropriate handling of data according to marking is achieved within the domain and at its boundary by a combination of electronic and procedural means. The strength of the means must be appropriate to the volume and sensitivity of the data and the threats faced if the domain is to be regarded as secure by its owner. The threat faced by a domain which communicates with no other domain is significantly less than that faced by a domain which intercommunicates with another. When two domains intercommunicate it is frequently the case that the systems of marking within each domain will be different. It is likely that there may be equivalence between markings at the lowest level of sensitivity, but at ligher levels this is unlikely unless there is some arrangement between the owners of the two domains. When non-equivalence between the marking systems in two domains exists then every marking in one domain which does not exist in the other must by definition prevent export of data so marked across that domain boundary. When one domain may intercommunicate with another at one shared low level of sensitivity marking, but also contains data at a higher level of sensitivity which may not be communicated it is convenient to denote that domain as "high", and the other domain as "low".

Thus, a customer having "restricted" and "not protectively marked" data would see his security domain as a high security domain relative to his information technology service provider. This would be due to the information service provider having the ability to support the "not protectively marked" sensitivity of data, but not the "customer restricted" sensitivity data. On the other hand, from the information technology service provider's perspective, it may very well be the case that the customer's security domain would be a low security domain as to the proprietary or otherwise protected information directly and separately pertaining to the information technology service provider.

It is most economical to locate the information technology service provider's staff in the provider's own security domain, which his customers are likely to view as "low" with respect to their own individual domains which they will regard as "high". However, those providing services in support of high security domain data and programs must comply with the needs of their customers to reduce or eliminate threats to the confidentiality, integrity and availability of their systems and data.

One solution is to completely separate high security domains and low security domains such that only high security domain computers can process high security domain programs and data. Unfortunately, to do so can double or even further increase the number of workstations required in providing the appropriate level service to the high security domains.

Another solution to the problem provides compartmented mode workstations. Unfortunately, such an approach does not permit the use of standard commercial operating systems and applications. As a result, maintenance costs and interoperability limitations plague known approaches using compartmented mode workstations.

Accordingly, there is a need for an economical method and system that provides the information technology service provider and the different customers served the ability to support differing security domain requirements.

A further need exists for providing an information technology service provider the ability to support from his own equipment a variety of customer's security domain requirements when each customer views the information technology service provider as operating in a low security domain.

A further need exists for addressing the problem of a first security domain, which may be considered high security domain relative to a second security domain, needing to avoid having data from the first security domain flow into the second, comparatively lower, security domain.

SUMMARY OF THE INVENTION

In accordance with the present invention, a method and system for dynamically extending the authenticated security domain boundary of a network of computing devices is provided that substantially eliminates or reduces the disadvantages and problems associated with prior methods and systems for maintaining separation between security domains.

According to one aspect of the present invention, there is provided a method and system for dynamically extending a security domain boundary that includes dynamic high security domain extension instructions for dynamically forming an extended high security domain through a protected communication path. The protected communication path extends from a first computer associated with a high security domain into a second computer associated with low security domain and establishes an extended high security domain within the second workstation. The protected communication path forms an isolation barrier for separating the extended high security domain from the low security domain within the second computer. Authentication instructions temporarily authenticate objects associated with the low security domain for including the temporarily authenticated objects within extended high security domain. Returning instructions return the authenticated objects to the low security domain following the completion of processing within the extended high security domain.

The present invention provides a method and system for enabling a workstation which is normally a member of the service provider's low security domain to be authenticated as an extended member of the customer's high security domain for the duration of a service providing activity. Then, the workstation reverts to the service provider's low security domain. Because the process extends an already existing high security domain, the present invention avoids communication between domains in the conventional sense. With the dynamic domain boundary extension, a workstation which is normally in a low security domain mode operates in a high security domain mode. During this operation, the workstation is accorded the same degree of physical protection and access control as would be provided for a dedicated high security domain workstation.

An aspect of the present invention is a process for authenticating an incoming request from a device in a different security domain and of maintaining the confidentiality and integrity of a session. The strength of the mechanisms is commensurate with the difference in levels of data sensitivity in the two domains. A key aspect of the present invention is to produce a sequentially compartmented mode workstation, rather than a concurrently compartmented mode workstation which relies on labels being attached to data objects and interpreted and operated upon by operating systems and application software.

A technical advantage of the present invention is the ability for a workstation which is normally in the low security domain to temporarily migrate into a high security domain such that no data crosses a domain boundary in contravention of the applicable domain restrictions.

The process recognizes and responds to dynamic domain boundary extension requests and establishes authenticated sessions for outbound dynamic domain boundary extension to a remote high security domain device the present invention, all the while, controls communication across the domain boundary to a degree and strength commensurate with the level of sensitivity of the data within the domain.

The present invention authenticates the remote device and maintains the confidentiality and integrity of the remote session. With the present invention, the strength of the mechanism providing the dynamic domain boundary extension is commensurate with the level of sensitivity of the data in the high security domain, as well as the trustworthiness of the path to the remote device.

The process further provides an operating system for separating and controlling access to workstation resources used in the low security domain and multiple high security domain roles. An authentication mechanism of the present invention provides, in the low security domain, access control on a user-by-user basis.

The present invention further supports authentication protocols and technologies that may be required by high security domains. This may include support of session initiation key material, biometric parameter measurements and other devices that may establish a desired strength of trust that as authentication is bona fide, thereby permitting boundary extension within an acceptable risk level.

Yet another aspect of the present invention addresses software drivers for printers and associated peripherals which must interface either a low or high security domain. The method and system provide printing devices directly attached to workstations capable of accepting dynamic domain boundary extension commands, which printing devices may be used by the workstation exclusively in a high security domain and sequentially in a low security domain.

Other technical advantages are readily apparent to one skilled in the art from the following FIGUREs, description, and claims.

BRIEF DESCRIPTION OF THE DRAWINGS

For a more complete understanding of the present invention and advantages thereof, reference is now made to the following description which is to be taken in conjunction with the accompanying drawings and in which like reference numbers indicate like features and further wherein.

DETAILED DESCRIPTION OF PREFERRED EMBODIMENT

The preferred embodiment of the present invention and its advantages are best understood by referring to FIGS. 1 through 6 of the drawings, like numerals being used for like and corresponding parts of the various drawings.

Figure 1:
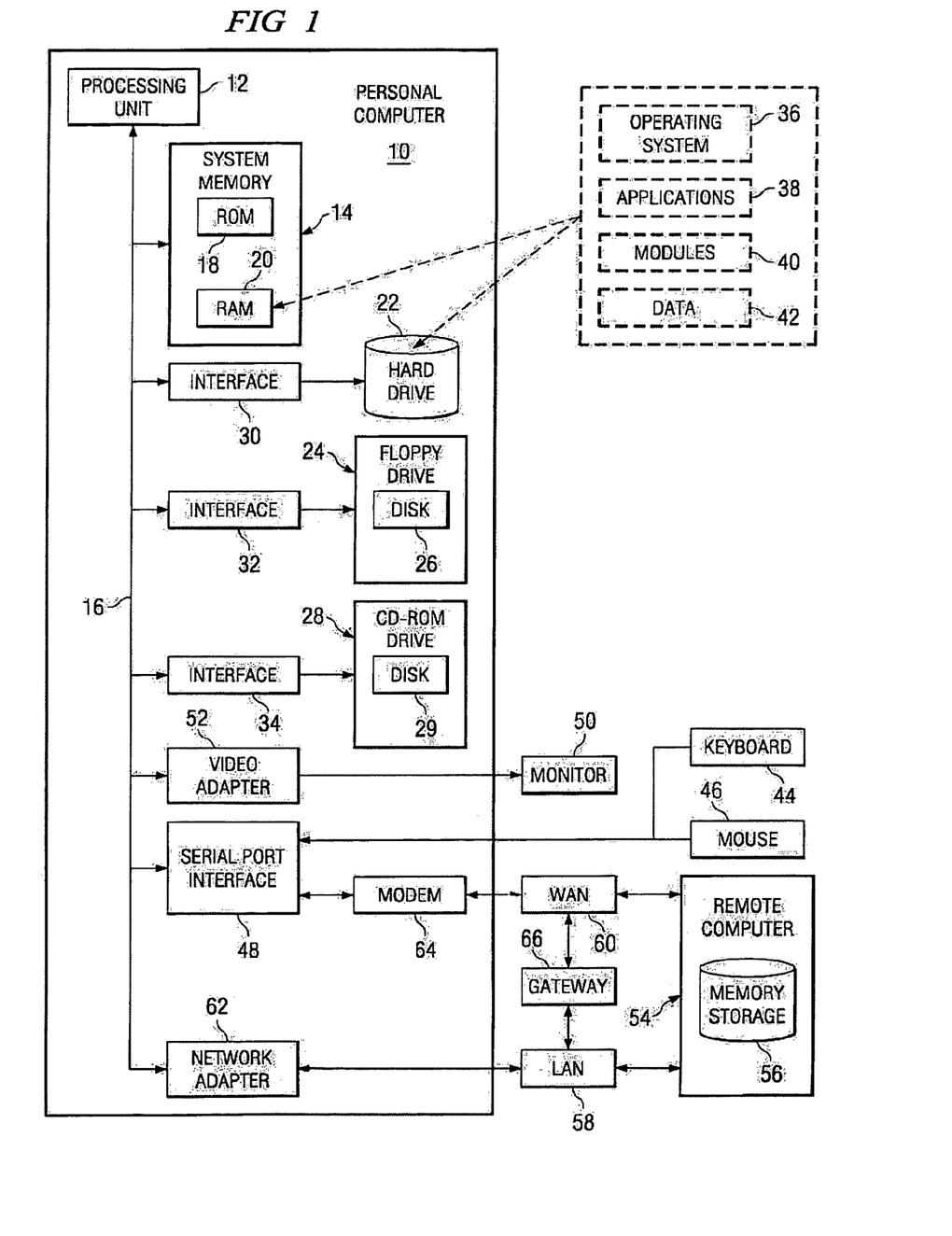
FIG. 1 is a block diagram of a computer system in which an embodiment of the present invention the present invention may be implemented.

FIG. 1 illustrates a general-purpose computer 10 that may be used as one part of the dynamic domain boundary extension process. General-purpose computer 10 may be used as a stand-alone computer or as part of a larger, networked system of personal computers. Using at least two such computers, for example, the present invention makes possible dynamic extension of a high security domain from a first general-purpose computer 10 into a second general-purpose computer 10. Here, FIG. 1 provides an understanding of how one might use the system of the present invention. General-purpose computer 10 may be used to execute distributed applications and/or distributed and individually operating system services through an operating system.

With reference to FIG. 1, an exemplary system for implementing the invention includes a conventional computer 10 (such as personal computers, laptops, palmtops, set tops, servers, mainframes, and other variety computers), including a processing unit 12, system memory 14, and system bus 16 that couples various system components including system memory 14 to the processing unit 12. Processing unit 12 may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 12.

System bus 16 may be any of several types of bus structure including a memory bus or memory controller, a peripheral bus, and a local bus using any of a variety of conventional bus architectures such as PCI, VESA, AGP, Microchannel, ISA and EISA, to name a few. System memory 14 includes read only memory (ROM) 18 and random access memory (RAM) 20. A basic input/output system (BIOS), containing the basic routines that help to transfer information between elements within the computer 10, such as during start-up, is stored in ROM 18.

Computer 10 further includes a hard disk drive 22, a floppy drive 24, e.g., to read from or write to a removable disk 26, and CD-ROM drive 28, e.g., for reading a CD-ROM disk 29 or to read from or write to other optical media. The hard disk drive 22, floppy drive 24, and CD-ROM drive 28 are connected to the system bus 16 by a hard disk drive interface 30, a floppy drive interface 32, and an optical drive interface 34, respectively. The drives and their associated computer-readable media provide nonvolatile storage of data, data structures, computer-executable instructions, etc. for computer 10. Although the description of computer-readable media provided above refers to a hard disk, a removable floppy and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 20, including an operating system 36, one or more application programs 38, other program modules 40, and program data 42. A user may enter commands and information into the computer 10 through a keyboard 44 and pointing device, such as a mouse 46. Other input devices (not shown) may include a microphone, joystick, game pad, satellite dish, scanner, or the like. These and other input devices are often connected to the processing unit 12 through a serial port interface 48 that is coupled to the system bus, but may be connected by other interfaces, such as a parallel port, game port or a universal serial bus (USB). A monitor 50 or other type of display device is also connected to the system bus 16 via an interface, such as a video adapter 52. In addition to the monitor, computers typically include other peripheral output devices (not shown), such as speakers and printers.

Computer 10 may operate in a networked environment using logical connections to one or more remote computers, such as a remote computer 54. The remote computer 54 may be a server, a router, a peer device or other common network node, and typically includes many or all of the elements described relative to the computer 10, although only a memory storage device 56 has been illustrated in FIG. 1. The logical connections depicted in FIG. 1 include a local area network (LAN) 58 and a wide area network (WAN) 60. Such networking environments are commonplace in offices, enterprise-wide computer networks, intranets and the Internet.

When used in a LAN networking environment, the computer 10 is connected to the LAN 58 through a network interface or adapter 62. When used in a WAN networking environment, computer 10 typically includes a modem 64 or other means for establishing communications (e.g., via the LAN 58 and a gateway or proxy server) over the wide area network 60, such as the Internet. Modem 64, which may be internal or external, is connected to the system bus 16 via the serial port interface 48. In a networked environment, program modules depicted relative to the computer 10, or portions thereof, may be stored in the remote memory storage device 56.

It will be appreciated that the network connections shown are exemplary and other means of establishing a communications link between the computers may be used. FIG. 1 only provides one example of a computer that may be used with the invention. The invention may be used in computers other than general-purpose computers, as well as on general-purpose computers without conventional operating systems.

By definition, a high security domain contains data and processes which may never be accessed from a domain which is low relative to the high security domain. However, the high security domain may contain data and processes which could be accessed from the low security domain were the high security domain able to provide separation between the two classes of data and processes. Such may occur, for example, through the use of multi-level secure operating systems. The present invention, therefore, enables a workstation, such as general-purpose computer 10, which is normally a member of the service provider's low security domain to be authenticated as a member of the customer's high security domain for the duration of a service providing activity. Subsequently, the present invention reverts general-purpose computer 10 to the service provider's low security domain. Thereafter, secure or cross-boundary communication between domains does not take place. During the domain boundary extension, the general-purpose computer 10 operates within the high security domain and, therefore, is accorded the same degree of physical protection and access control as would be provided for a dedicated workstation in the given high security domain.

Figure 2:
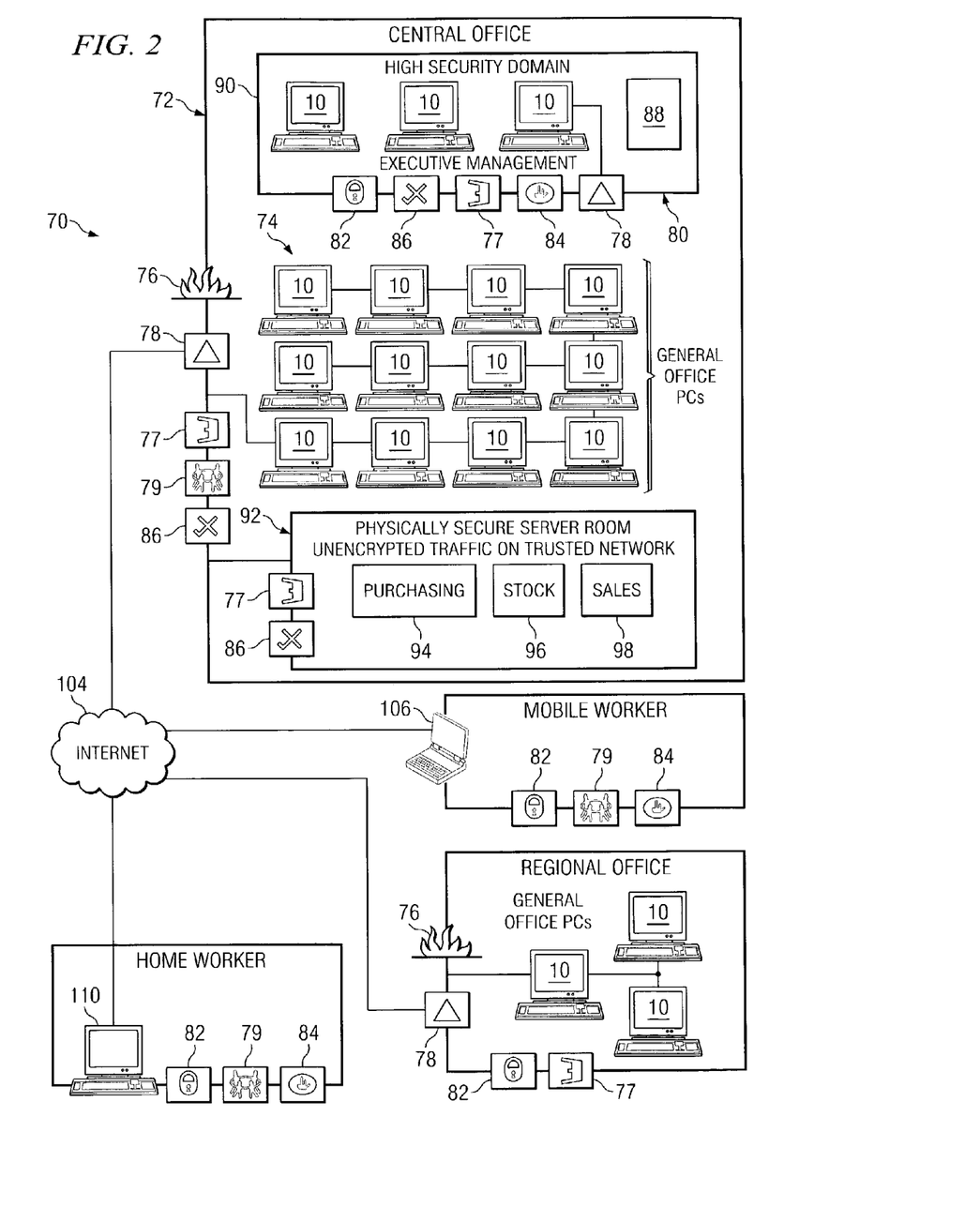
FIG. 2 illustrates a network of computer systems including both high security domains and low security domains for implementing the method and system of the present invention.

To provide an example of a multiple domain network which may use the process of the present invention, FIG. 2 shows a potential networked system 70 of computers, including for instance personal computer 10. Referring to network system 70, there may be at central office 72 a number of personal computers 10 serving collectively as a networked personal computer cluster 74 for performing a range of low security domain processes and generating and using low security domain data. As often exists, central office 72 may use a firewall 76 for preventing unauthorized access to all computers within central office 72. Also, central office 72 may employ a set of highly secure, encryption, authentication, and dynamic virtual private network (VPN) processes as integrated security process 78. Central office 72 may further employ a network encryption gateway 77, a dynamic virtual private network process 79, and a network authentication server process 86, each performing the respective security and network protection functions associated with their generally accepted descriptions and functional capabilities.

Central office 72 may establish a high security domain 80 for processing the most sensitive information and performing highly proprietary or otherwise highly secret information. For these purposes, high security domain 80 may employ a further integrated security process 78, as well as a client access control process 82 and a client data encryption process 77. Moreover, high security domain 80 may use a network authentication server process 86 associated with network authentication server hardware. As a result, high security domain 80 presents a domain boundary 90 that separates personal computers 10 of high security domain 80 from the array 74 of networked personal computers For purposes of the present invention, high security domain 80 enforces security within networked system 70. High security domain 80 can be viewed as a set of permissions granted to one or more principals. A permission is an authorization by the networked system 70 that allows a principal to execute a particular action or function. Typically, permissions involve an authorization to perform an access to a computer resource in a particular manner. An example of an authorization is an authorization to "write" to a particular directory in a file system, such as the computer 10 within high security domain 80. A permission can be represented in numerous ways in networked system 70. For example, a data structure containing text instructions can represent permissions.

Central office 72 may use a physically secure server room 92, which may include, for example, a purchasing department server 94, a stock or inventory asset transactions server 96, and a sales server 98. Preferably, server room 92 may employ a separate encryption gateway 77 and associated network authentication server process 86.

Internet cloud 104 depicts conceptually that, through server communications, remote access to central office 72 is possible. In particular, mobile workstation 106 may employ remote client access control process 82, the remote components for a dynamic virtual private network 79, and remote client data encryption process 84 for permitting a mobile worker to communicate with central office 72 through Internet connection 104. Such a mobile worker may be a member of a field sales force through client access control, has the ability to access computers and servers at central office 72. Likewise, home workstation 110 may be a personal computer that uses client access control process 82, dynamic virtual private network 79, and client data encryption process 84 also to communicate through Internet 104 with central office 72. A regional office may also employ both a firewall 76 and an integrated security process 78, as well as a client access control process 82 and network encryption gateway 77 for secure communications through Internet 104 with central office 72. It is within an environment such as networked system 70 that the present method and system may operate.

Figure 3:
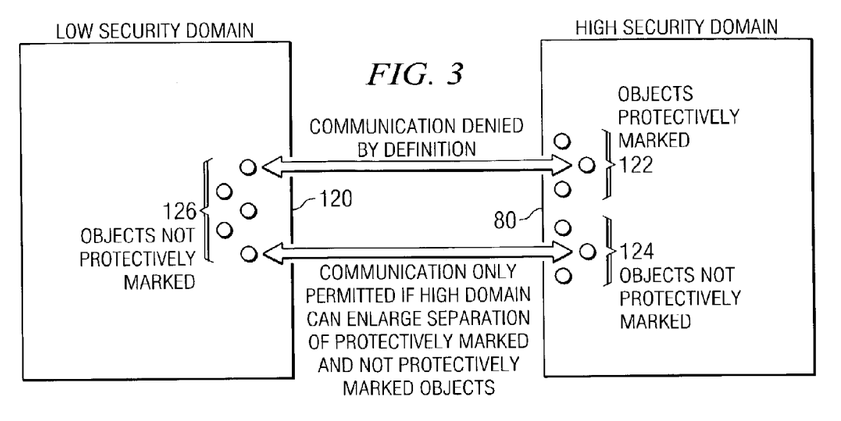
FIGS. 3 through 5 depict the dynamic domain boundary extension process of one embodiment of the present invention.

FIG. 3 shows a conceptual diagram that depicts the security domain functional distinctions between high security domain 80 and low security domain 120. For example, low security domain 120 may be that of an array 74 networked personal computer within central office 72 or regional office 120 of FIG. 2. As FIG. 3 depicts, communication between high security domain 80 and low security domain 120 is denied, essentially by the very definition of the two domains. There may be provision for communications between the two domains, however, only if high security domain 80 can enforce separation of protectively marked objects 122 from other objects. Such a separation may be the separation of not protectively marked objects 124 of high security domain 80 from not protectively marked objects 126 of low security domain 120. The separation, then, is between protectively marked objects 122 and not protectively marked objects 124. This allows not protectively marked objects 124 to cross-out of boundary 131 without accidentally or intentionally leaking protectively marked objects 122 into low security domain 120.

For the purposes of explanation, it shall be assumed both high security domain 80 and low security domain 120 employ object oriented software. Consequently, the code is in the form of methods associated with objects that belong to classes. In response to instructions embodied by code executed by a code executor, the code executor creates one or more objects. An object is a record of data combined with the procedures and functions that manipulate a record. All objects belong to a class. Each object belonging to a class has the same fields or attributes and the same methods. The methods are the procedures, functions, or routines used to manipulate the object.

An object is said to be an "instance" of the class to which the object belongs. One or more class definitions are contained in the object-oriented code. The fields and method of the object belonging to a class are defined by a class definition. These class definitions are used by the code executor to create objects which are instances of the classes defined by the class definitions.

High security domain 80 and low security domain 120 may be file servers, including file servers that are part of the World Wide Web network of server connected by the Internet. Low security domain 120 typically does not operate under the direct control of the operators of high security domain 80. Because the not protectively marked object 126 of low security domain 120 are considered to pose a high security risk if allowed to communicate with high security domain 80 because of the protectively marked objects 122 which it contains and which are by marking disallowed from communication with objects 124 and 126. The set of computer resources that these low security domain objects may access is usually restricted to those which do not pose security threats. Objects protectively marked 122 of high security domain 80 are code usually developed by high security domain developers. High security domain objects such as objects protectively marked 122 are considered to be reliable and pose much less security risk than remote code.

While there exists a potential for communication between high security domain 80 and low security domain 120, there are significant restrictions on the practical reality of doing so. If a not protectively marked object 126 in low security domain 120 were to have free communication with objects protectively marked 122 in high security domain 80, then the not protectively marked object 126 communicated with one of the protective markings unsupported by low security domain 120. As a result, the not protectively marked objects 126 would subsequently have to be treated as having the most sensitive protective marking of high security domain 80, rather that its original low security domain 120 marking.

This process of revising protective marking after uncontrolled interaction is generally termed "floating up." Such float up could only be avoided if high security domain 80 implemented mechanisms to separate objects at different levels of protective marking. High security domain 80 would also need to prevent not protectively marked objects 126 from communicating with protectively marked objects 122, which objects low security domain 120 may not support. Having floated up, not protectively marked object 126 would not be able to return to low security domain 120, or low security domain 120 would need to totally float up along with the floated up not protectively marked object 126. As a practical matter, however, such is generally not possible, because low security domain 120 does not include the necessary protective mechanisms to protect low security domain 120 in its floated up state. The result would be a breach of confidentiality in high security domain 80.

Subsequent communications between a floated up low security domain 120 and other high security domains 80 which might not support the protective markings of the first high security domain 80 would cause them to float up as well. This would cause the entire community of service provider's low security domains 120 and their customers' high security domains 80 to float up to the level of the highest security domain 80 of all the information technology service provider's customers. Such a result, of course, would be unacceptable for the service provider's customers.

The present invention solves this problem by preventing low security domain 120 from floating up during a period of protected communication with high security domain 80. The present invention prevents an object 126 in domain 120 communicating with high security domain 80 from affecting all other objects 126 in low security domain 120. The present invention establishes a protected communication between low security domain 120 and high security domain 80 protected communication path prevents leaks into low security domain 120. The strength of the isolation and leak prevention is designed to be generally acceptable to the security managers controlling high security domain 80. The present invention, therefore, extends the boundary of high security domain 80 to encompass at least one object within low security domain 120. The process removes the object from low security domain 120 for the period of the extension of the high security domain 80 boundary. Furthermore, the process removes the need for communication between objects in different domains.

Figure 4:
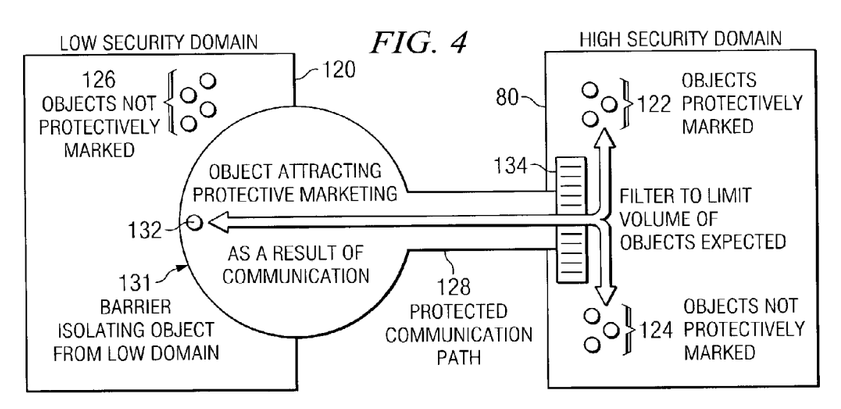

FIG. 4 shows how the preferred embodiment of the present invention supports protected communication between high security domain 80 and low security domain 120. Referring to FIG. 4, the present invention establishes protected communication path 128 which may dynamically extend from high security domain 80 and into low security domain 120. Protected communication path 128 maintains within low security domain 120 a barrier 131 established in extended high security domain 133 isolating protectively marked object 132 from not protectively marked objects 126. Within high security domain 80, the present invention establishes filter 134 for limiting the number of objects exposed to protected communication path 128.

The dynamic domain boundary extension of the present invention addresses security concerns of those responsible for maintaining the integrity of the high security domain 80 boundary. As a result of the present process, there is much less threat of exposure of the data contained in protectively marked objects 122. The threat is limited to protected communication path 128 which controls the degree of access by affected objects attracting protective marking 132 and allows objects protectively marked 122 and objects not protectively marked to be viewed, but not copied.

One embodiment of invention further controls protection by implementing clean-up mechanisms as part of the process of returning affected objects to operation within low security domain 120. The process assures that the affected object has been cleaned and that the threat posed by the residual content is small enough to be acceptable to the security managers controlling high security domain 80. As a result, the affected object may be returned to low security domain 120.

One aspect of the present invention is to anticipate the extension of the high security domain 80 boundary extension to encompass a low security domain object from low security domain 120. Thereafter, low security domain object 132 may initiate connections to the high security domain 80. Such initiation poses a threat to high security domain 80, which is mitigated by an authentication process that is independent of user authentication in low security domain 120 and which is acceptable to the high security domain 80 security managers.

Development of commercial off-the-shelf software components capable of implementing the various processes and threat mitigations described above has reached a point where an implementation of a dynamic domain boundary extension such as appearing in FIG. 4 may be provided by a variety of advanced software and hardware products which are commercially available. For example, authentication of an established connection between low security domain object 132 within extended high security domain 133 may occur through the use of the Barron McCann X-Kryptor hardware operating with one of that company's dynamic VPN client software applications. However, other similar products from other manufacturers may exist and prove quite satisfactory for purposes of the present invention in providing authentication during session initiation. In fact, some such products may allow third party clients for further enhancing the flexibility and utility of the present invention.

Protection of communication path 128 between low security domain 120 and high security domain 80 also may be achieved through the use of the Barron McCann X-Kryptor hardware and the Dynamic VPN Client software. Isolation of low security domain object 132 from the other low security domain 120 objects 126 during communication with high security domain 80 may be accomplished, for example, using the Barron McCann X-Kryptor Dynamic VPN Lock-down Client. Protection of high security domain 80 boundary where dynamic boundary extension requests are received through filter 134 may be supported by the Barron McCann X-Kryptor hardware operating, for example, in association with a Nokia Checkpoint Firewall-1 device. For various security situations and function of environments, the appropriately approved hardware devices and software programming may vary. However, the features of the present invention are set out here as salient functions of the present invention.

A distinction of the present invention includes the provision of a high security domain 80 dynamic domain boundary extension resource. The present invention makes possible the extension of a high security domain 80 boundary that includes authenticating an incoming request from a device in a different security domain. The present invention maintains the confidentiality and integrity of a session during the boundary extension process. The strength of the mechanism 79 that the present invention uses is commensurate with the difference in levels of sensitivity of the data in the associated high security domain 80 and low security domain 120.

A technical advantage of the present invention is the ability to conceal the internal structure of high security domain 80 from all other domains to a degree commensurate with the level of sensitivity of the data in the high security domain. The domain extension can reduce security concerns to a level acceptable to the managers of high security domain 80. A covert channel may be established through the existence of protectively marked objects 122 within objects attracting protective marking 132 not being removed following removal of protected communication path 128. These objects 122 may subsequently leak into the aggregate of objects not protectively marked 126 of low security domain 120. However, the bandwidth is sufficiently low as to be acceptable to managers having responsibility for maintaining high security domain 80.

The present invention allows a computer normally resident in low security domain 120 to accept protected communication path 128 for establishing dynamic extended high security domain boundary 133. The present invention uses an operating system capable of separating and controlling access to workstation resources used in low security domain 120 and multiple high security domain roles. The present invention provides an authentication mechanism in low security domain 120 that is capable of controlling access on a user-by-user basis to the resources of the computer which may be needed in both the low security domain 120 and multiple sequential high security domain 80 roles. The present invention provides the authentication mechanisms which may be required by high security domain 80, such as session initiation key material, biometric parameter measurement, and the like before the domain boundary may be extended. Furthermore, the process protects the confidentiality of high security domain data in transit between the permanent portion of high security domain 80 and object 132 by establishing protected communication path 128 across the untrusted medium of low security domain network. The strength of the security protection provided by protected communication path 128 is commensurate with the difference in levels of sensitivity of the data between high security domain 80 and low security domain 120.

The present invention prevents communication between low security domain object 132 and the other low security domain 120 resources once extended high security domain 133 has been established by protected communication path 128. Filter 134 limits the number of objects 122 and 124 of high security domain 80 which may be operated on by objects attracting protective markings 132 within extended high security domain 133. This reduces potential residual objects protectively marked 122 that were instantiated within object attracting protective marking 132 which may be leaked into low security domain 120 if clean up procedures in object 132 fail upon removal of protected communication path 128. By virtue of filter 134, any leakage of protectively marked objects 122 is maintained at a level acceptable by high security domain 80 managers. Thus, while filter 134 does not prevent leakage of objects protectively marked 122 into low security domain 120, as does boundary 131, filter 134 does limit the extent to which leakage occurs and any damage resulting thereby.

There are occasions when it is advantageous for high security domain 80 to exploit dynamic domain boundary extension across a low security domain 120 communications resource to reach outlying objects which are permanent members, but not in permanent communication with the main body of high security domain 80. The most frequent case may be remote printing resources used in association with low security domain 120 workstations which are capable of domain boundary extension operations. These remote high security domain objects must be accorded appropriate physical protection and access control. A particularly important aspect of the present invention, therefore, addresses the requirements relating to high security domains 80 and document printing resources.

Commercially available print devices generally do not provide the capabilities needed to support dynamic domain boundary extension. Accordingly, one approach could be to provide printing resources that directly attach to a computer capable of accepting domain boundary extensions. These printing resources may be used by an associated computer exclusively in any high security domain 80 role and shared with other low security domain 120 computers in the low security domain 120 role.

An alternative implementation provides a dedicated print management server and print devices which may accept connections from any high security domain. Such a server and related devices may authenticate the connections. High security domain 80 connections resulting from dynamic domain boundary extension may exclude connections from any other domain for the period of the extension. Sequential connections to multiple high security domain 80 may depend on the security manager of each high security domain 80 being prepared to share the print resource with all the connecting high security domains. This may depend, however, on the strength of the mechanisms available to separate the sensitive data on the print server and related devices.

The present invention makes possible providing information technology services to many customers, including national governments, who require data confidentiality. The present invention also enables such information technology services providers to support such customers on dedicated security domains from within a global corporate infrastructure.

Figure 5:
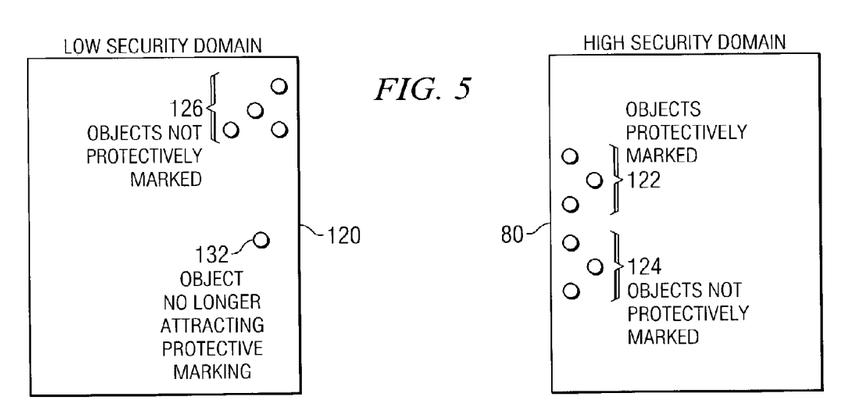

FIG. 5 depicts the state of high security domain 80 and low security domain 120 following the sequential functions of the present invention. Note that a potential communication path no longer exists between low security domain 120 and high security domain 80. This occurs following the removal of protected communication path 128 after dynamic domain boundary extension processing. At this point, there remain objects not protectively marked 126 and objects no longer attracting protective marking 132 within low security domain 120. High security domain 80 includes objects protectively marked 122 and objects not protectively marked 124.

Figure 6:
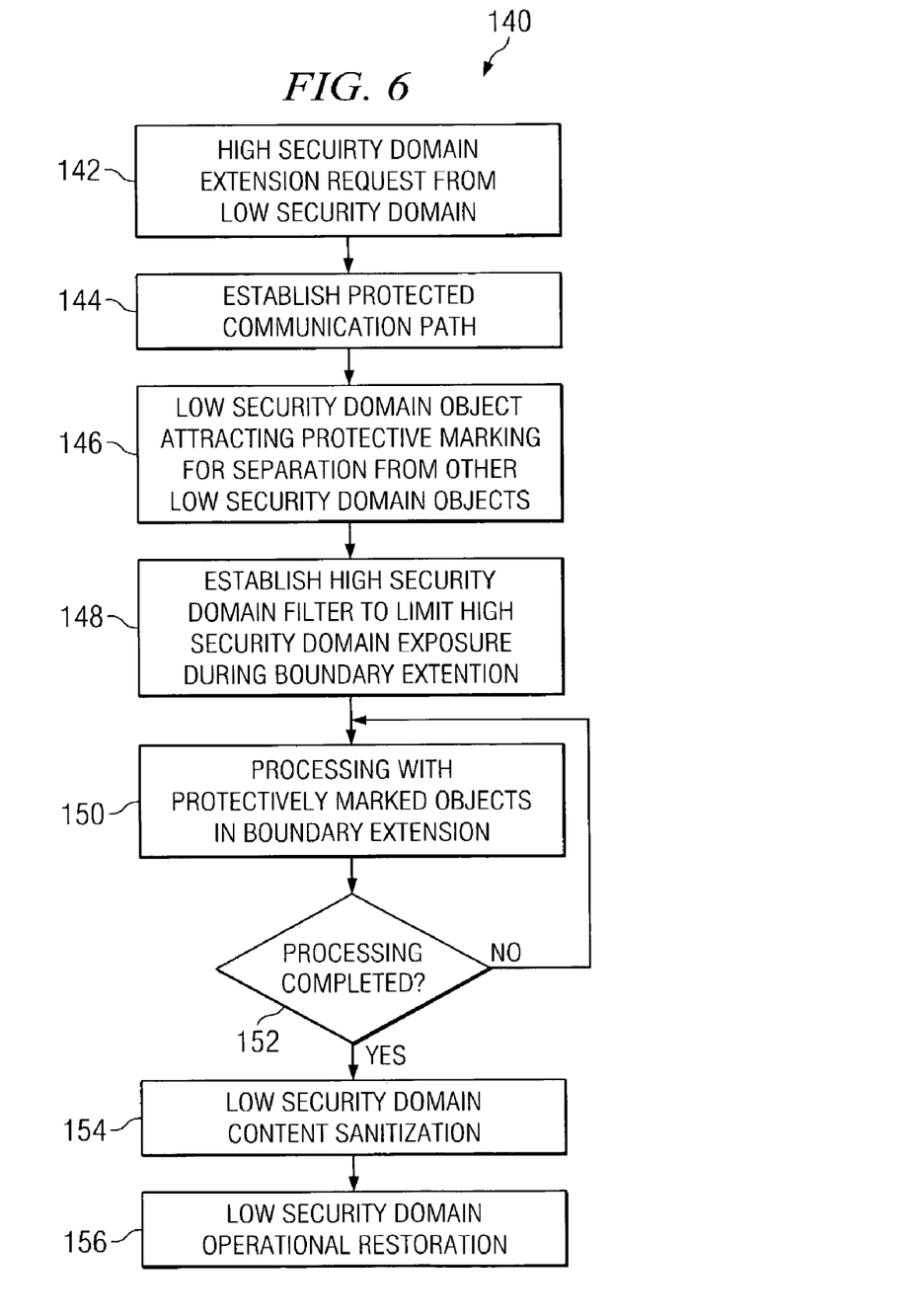
FIG. 6 presents a flow diagram for the process of the present invention.

FIG. 6 shows a flow diagram 140 depicting one embodiment of the process of the present invention for dynamically extending a security domain boundary. Beginning at step 142, the process of the present intentions may receive from within low security domain 120 a request for dynamically extending high security domain 80. In response, as step 144 shows, a protected communication path 128 is established (see FIG. 4). As step 146 shows, one or more low security domain objects 132 attract a protective marking for separating them from other low security domain objects 126.

Step 148 relates to the establishment within high security domain 80 of a filter 134 that limits high security domain objects exposure to protectively marked low security domain objects 132 and the remaining content of protected communication path 128. At step 150, processing of low security domain instructions and data relating to the protectively marked low security domain objects 130 is depicted. As query 152 shows, such processing continues until desired by the associated programs and/or users.

Step 154 connotes the step of cleansing or otherwise sanitizing the protectively marked low security domain objects following the processing relating to them. Then, at step 156, the low security domain is restored to its prior status.

The present invention, therefore, provides a method and system for dynamically extending a security domain boundary that includes dynamic high security domain extension instructions for dynamically forming an extended high security domain through a protected communication path from a first computer associated with a high security domain into a second computer associated with low security domain. The invention establishes the extended high security domain within the second computer. The protected communication path forms an isolation barrier separating the extended high security domain from the low security domain. Authentication instructions temporarily authenticate at least one object associated with the low security domain. Returning instructions return at least one object to the low security domain.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

We claim:

1. A system for authenticated dynamic extension of security domain boundaries, comprising:
   a first computer executing dynamic high security domain extension instructions for dynamically forming an extended high security domain through a protected communication path from a the first computer associated with a high security domain into a second computer associated with low security domain;
   the second computer executing establishing instructions within said extended high security domain within said second computer for establishing the protected communication path between said high security domain and said extended high security domain within low security domain, said protected communication path forming an isolation barrier separating said extended high security domain from said low security domain;
   the first computer executing instructions for receiving an authenticated access request from a user within said low security domain for temporary authentication with said high security domain;
   the first computer executing instructions for providing temporarily authenticated access to said high security domain in response to said high security domain receiving said authenticated access request; and
   the second computer executing authentication instructions associated with said low security domain and said high security domain for temporarily authenticating at least one object associated with said low security domain.

2. The system of claim 1, further comprising returning instructions for subsequently returning said at least one object to said low security domain.

3. The system of claim 1, further comprising instructions for verifying the security access authorization of an individual user of said computer during said temporary authentication within said high security domain.

4. A system for authenticated dynamic extension of security domain boundaries, comprising:
   a computer executing instructions for enabling the computer, which is normally a member of a low security domain, to be temporarily authenticated as a member of remote high security domain; and the computer executing instructions for reverting the computer to the service provider's low security domain at the cessation of the service provision;
   the computer executing instructions for authenticating an incoming request from a device associated with different security domain, and instructions for maintaining the confidentiality and integrity of a session associated with said device, wherein the strength of said authentication instructions relates to a difference in data sensitivity levels between said high security domain and said low security domain;
   the computer executing instructions for controlling communications across a domain boundary between said high security domain and said low security domain at a strength level commensurate with data sensitivity level appropriate to the respective domain; and
   the computer executing instructions for recognizing and permitting domain boundary extension requests and authenticating sessions.

5. The system of claim 4, wherein the computer in said high security domain role is accorded the same degree of physical protection and access control as would be provided for a dedicated computer in an associated high security domain.

6. The system of claim 4, further comprising instructions for concealing the internal structure of said high security domain from all other domains to a degree commensurate with the data sensitivity level of said high security domain.

7. The system of claim 4, further comprising instructions for reducing to a predetermined level the high security domain bandwidth between said high security domain and said low security domain normally containing the domain boundary extension remote device upon the removal of said extended high security domain.

8. A method for dynamically extending authenticated security domain boundaries, comprising the steps of:
   dynamically forming an extended high security domain through a protected communication path from a first computer associated with a high security domain into a second computer associated with low security domain;
   establishing a protected communication path between said high security domain and said extended high security domain within low security domain, said protected communication path forming an isolation barrier separating said extended high security domain from said low security domain;
   receiving an authenticated access request from a user within said low security domain for temporary authentication with said high security domain;
   providing temporarily authenticated access to said high security domain in response to said high security domain receiving said authenticated access request; and
   temporarily authenticating at least one object associated with said low security domain.

9. The method of claim 8, further comprising the step of subsequently returning said at least one object to said low security domain.

10. The method of claim 8, further comprising the step of verifying the security access authorization of an individual user of said computer during said temporary authentication within said high security domain.

11. A method for dynamically extending an authenticated security domain boundary, comprising the steps of:
   enabling a computer which is normally a member of a low security domain to be temporarily authenticated as a member of remote high security domain;
   reverting the computer to the service provider's low security domain at the cessation of the service provision;
   authenticating an incoming request from a device associated with different security domain, and maintaining the confidentiality and integrity of a session associate with said device, wherein the strength of said authentication instructions relates to a difference in data sensitivity levels between said high security domain and said low security domain; and
   controlling communications across a domain boundary between said high security domain and said low security domain at a strength level commensurate with data sensitivity level appropriate to the respective domain; and
   recognizing and permitting domain boundary extension requests and authenticates sessions.

12. The method of claim 11, further comprising the step of according a low security domain computer in said extended high security domain role the same degree of physical protection and access control as would be provided for a dedicated computer in an associated high security domain.

13. The method of claim 11, further comprising the steps of concealing the internal structure of said high security domain from all other domains to a degree commensurate with the data sensitivity level of said high security domain.

14. The method of claim 11, further comprising the steps of reducing to a predetermined level the high security domain bandwidth between said high security domain and said low security domain normally containing the domain boundary extension remote device upon the removal of said extended high security domain.

15. A computer-readable storage medium encoded with computer-executable instructions for authenticated dynamic extension of security domain boundaries, comprising:

dynamic high security domain extension instructions for dynamically forming an extended high security domain through a protected communication path from a first computer associated with a high security domain into a second computer associated with low security domain;

instructions for executing within said extended high security domain within said second computer for establishing the protected communication path between said high security domain and said extended high security domain within low security domain, said protected communication path forming an isolation barrier separating said extended high security domain from said low security domain;

instructions for receiving an authenticated access request from a user within said low security domain for temporary authentication with said high security domain;

instructions for providing temporarily authenticated access to said high security domain in response to said high security domain receiving said authenticated access request; and authentication instructions associated with said low security domain and said high security domain for temporarily authenticating at least one object associated with said low security domain.

* * * * *

UNITED STATES PATENT AND TRADEMARK OFFICE
CERTIFICATE OF CORRECTION

PATENT NO. : 7,469,417 B2 Page 1 of 1
APPLICATION NO. : 10/462994
DATED : December 23, 2008
INVENTOR(S) : Jolyon A. Fearnley et al.

It is certified that error appears in the above-identified patent and that said Letters Patent is hereby corrected as shown below:

In column 13, line 9, in Claim 1, after "from" delete "a".

Signed and Sealed this

Twenty-sixth Day of January, 2010

David J. Kappos
*Director of the United States Patent and Trademark Office*